United States Patent [19]

Esman et al.

[11] Patent Number: 5,526,170
[45] Date of Patent: Jun. 11, 1996

[54] FIBER OPTIC CONTINUOUS TRUE TIME-DELAY MODULATOR

[75] Inventors: Ronald D. Esman, Burke, Va.; Michael J. Monsma, Waldorf, Md.

[73] Assignee: The United States of America as represented by the Secretary of the Navy, Washington, D.C.

[21] Appl. No.: 102,934

[22] Filed: Aug. 6, 1993

[51] Int. Cl.$^6$ .............................. G02B 6/26; G02F 1/00; H01Q 3/36
[52] U.S. Cl. .......................... 359/279; 359/276; 359/332; 385/3; 356/318
[58] Field of Search .................................... 359/276, 278, 359/279, 326, 332; 385/3, 122; 250/227.23; 356/318

[56] References Cited

U.S. PATENT DOCUMENTS

| | | | |
|---|---|---|---|
| 4,216,474 | 8/1980 | Levine | 385/3 |
| 4,671,604 | 6/1987 | Soref | 350/96.15 |
| 4,671,605 | 6/1987 | Soref | 359/279 |
| 4,714,314 | 12/1987 | Yang et al. | 359/279 |
| 4,814,774 | 3/1989 | Herczfeld | 342/372 |
| 5,051,754 | 9/1991 | Newberg | 342/375 |

OTHER PUBLICATIONS

Esman et al, LEOS Mtg., Jul. 26, 1993, pp. 71–72.
Esman et al, SPIE Proc., Apr. 12, 1993, vol. 1958, pp. 133–143.
Esman et al, Elect. Lett., vol. 28, #20, Sep. 24, 1992, pp. 1905–1907; abst only herewith.
Goldberg et al, IEE Proc., Part J.: Optoelectronics, vol. 139, #4, Aug. 1992, pp. 288–295; abst only herewith.
Esman et al., "Microwave True Time–Delay Modulator Using Fibre–Optic Dispersion", Elect. Ltrs., vol. 28, No. 20, pp. 1905–1907, Sep. 92.
Duling et al., "Single–Polarization Fibre Amplifier", Elect. Ltrs., vol. 28, No. 12, pp. 1126–1128, Jun. 92.
Soref, "Optical Dispersion Technique For Time–Delay Beam Steering", App. Opt., vol. 31, No. 35, pp. 7395–7397, Dec. 92.
Johnson et al., "Antenna Engineering Handbook", McGraw–Hill Book Co., New York, NY, pp. 20–1–20–67, 1984 ed.

*Primary Examiner*—Nelson Moskowitz
*Attorney, Agent, or Firm*—Thomas E. McDonnell; Charles J. Stockstill

[57] ABSTRACT

The fiber optic true time delay modulator generates a continuously variable true time-delay (i.e., phase shift) by utilizing the dispersion characteristic of a single mode optical fiber. The signal to be variably delayed modulates a continuous wave optical signal from a tunable laser source which is applied to a dispersive optical fiber wherein the phase shift occurs. The optical intensity output of the dispersive optical fiber is converted back into electrical energy by a photodetector for use in radio frequency, microwave and millimeter wave electronic devices. The invention can be used to generate multiple synchronized output signals by using a multiple wavelength laser or by combining outputs from several independently tuned lasers. Also. frequency and phase shifting is inherently provided by modulating the time delay.

23 Claims, 3 Drawing Sheets

FIBER OPTIC CONTINUOUS TRUE TIME-DELAY MODULATOR

BACKGROUND OF THE INVENTION

1. Field of the Invention

This invention relates generally to a communications time-delay circuits and more specifically to a continuously variable true time-delay (i.e., phase shift) circuits for radio frequency, microwave and millimeter wave signals using fiber optics.

2. Description of the Related Art

Some existing time-delay selective circuits are implemented using microwave or integrated optic switches to switch in or out an extra electrical path length—a length of cable for electrical transmission and a length of optical fiber in the case of fiber optic transmission. (See, U.S. Pat. No. 5,051,754, Newberg.) In order to continuously vary the time delay of the signal, the spacing between the source and the receiver, or the signal velocity, must change continuously. This is accomplished using either a direct path translator or a reflected path translator. However, the usefulness of any type of mechanical implementation will be severely limited by the precision and mechanical tolerance required. Other drawbacks of these techniques include the discrete nature of the incremented delay, complexity, size, weight and power requirements.

A popular method currently used for generating continuous phase shifts is vector modulation. This method provides a phase shift that is independent of frequency. However, this method suffers from problems of phase shift accuracy, limited bandwidth and high harmonic levels. A previous type of continuous true time-delay modulator is the piezoelectric optical fiber stretcher (See, U.S. Pat. No. 4,814,774, Herczfeld); however, this approach is limited by speed and size as well as by power supply requirements. Several other phase shifting methods include movable shortcircuit pistons (reflection mode), variactors, reciprocal and nonreciprocal ferrite devices and semiconductor diode designs. However, all of these methods are not only intended to provide a phase shift independent of frequency and suffer from limited bandwidth, amplitude modulation, signal distortion, etc.

Recent work by R. A. Soref (U.S. Pat. No. 4,671,604) teaches a system for wavelength dependent, tunable time delay system for electrical signals having a RF/electrical-to-optical converter with a selectable optical wavelength, a single-mode dispersive fiber, and an optical-to-RF/electrical converter. By selectively varying the wavelength of the optical signal, the electrical signal can be time delayed as desired in response to an electrical signal.

SUMMARY OF THE INVENTION

The object of this invention is to generate a continuously variable true time-delay in a circuit.

Another object if this invention is to provide a variable time-delay without significant component additions to a fiber optic system.

Yet another object of this invention is to use fiber optic components to generate multiple signals, each signal having a continuously variable true time-delay. The fiber optic components being any component suitable for use with fiber optics whether or not the components contains optical fiber.

A further object of this invention is to shift the frequency of a signal of interest proportional to the signal frequency.

A further object of this invention is to provide precise time-delay modulation with reduced timing jitter and associated noise and loss of signal.

A still further object of this invention is to provide a continuously variable time-delay circuit that is practical for use with RF, microwave, and millimeter wave frequencies.

A still further object of this invention is to provide a continuously variable time-delay circuit that avoids interaction between the signal to be delayed and the delay control (the wavelength of the optical source).

An still further object of this invention is to provide a continuously variable time-delay circuit that allows use of tunable laser sources that simultaneously exhibit several desirable characteristics: high power (>10 mW), wide tunability (>50 nm), narrow spectral width (<0.08 nm), polarized output, and easy interface with optical fibers and optical fiber devices.

The electrical signal to be variably delayed modulates a continuous wave optical signal from a tunable laser source that is then propogated along a dispersive fiber at a velocity determined by the wavelength of the tunable laser source and the index of refraction of the fiber. By utilizing the dispersive fiber, the overall fiber length and associated delay needed to obtain a desired range of delay is reduced. The true time-delayed optical signal at the output of the dispersive optical fiber is converted back into an electrical signal by a receiver or photodetector.

DESCRIPTION OF THE PREFERRED EMBODIMENTS

The apparatus described herein provides a unique and novel way to generate a continuously variable true time-delay (phase shift) for radio-frequency, microwave and millimeter wave signals.

Figure 1:
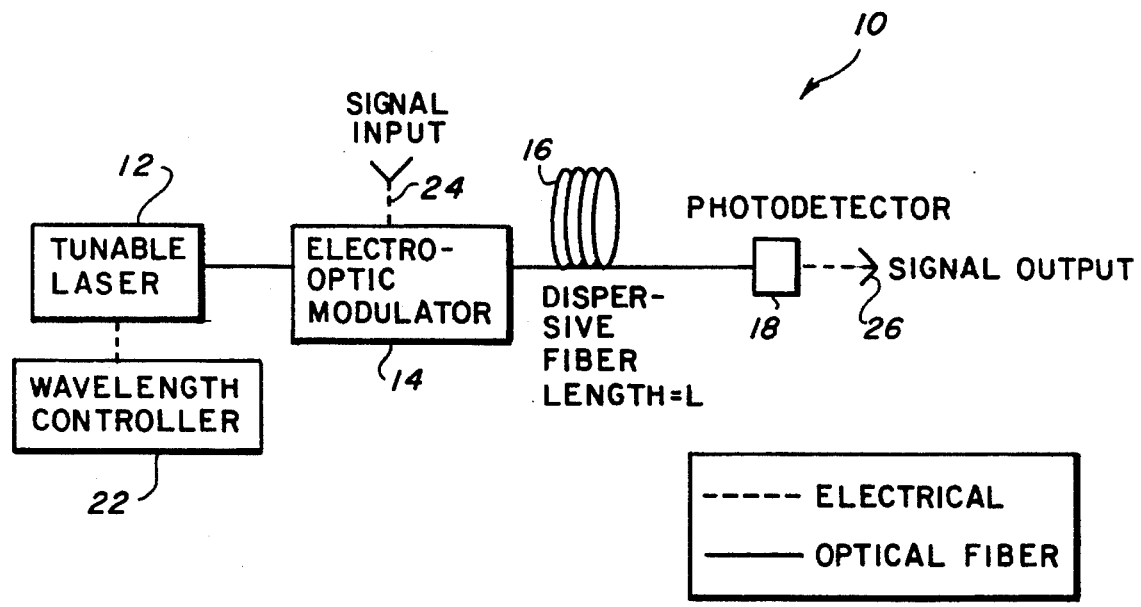
FIG. 1 is a schematic of the fiber optic continuous true time-delay modulator having a single tunable optical laser source.

In the preferred embodiment, FIG. 1, the fiber optic continuous true time-delay modulator 10 is comprised of five components; laser 12 capable of producing a narrow-linewidth optical carrier signal, electro-optic modulator 14, fiber 16, wavelength controller 22, and receiver or photo-detector 18.

The laser 12 is a continuously tunable fiber laser with a single wavelength output, e.g., Sigma (σ)-laser. Operation of the σ-laser 12 is described in Duling et al., *Single-Polarisation Fibre Amplifier*, Elec. Ltrs., Vol. 20 No. 12, Jun. 4, 1992, pp. 1126–1128, which is herein incorporated by reference. However, the tunable laser 12 can be of any type—semiconductor, fiber, gas, etc. capable of generating an optical carrier with a spectral width that is narrow when compared to the laser tuning range, i.e., the ratio of the spectral width to tuning range is preferably less than 0.01.

The wavelength controller 22 controls the wavelength of the optical carrier signals produced by the laser source 12 thereby setting and varying the propagation delay of an electrical signal 24 applied to the electro-optic modulator 14. In the preferred embodiment, the wavelength of the optical light output of the laser 12 is set by the voltage output of a wavelength controller 22 which may be (1) a constant voltage power supply (e.g., Hewlett-Packard Model 6205C, manufactured by Hewlett-Packard of Rockville, Md.) where wavelength adjustment is accomplished manually by an operation setting the front panel control, (2) an electrical signal generator (e.g., Hewlett-Packard Model 8116A, manufactured by Hewlett-Packard of Rockville, Md.) where various voltage waveforms (e.g., triangle, saw-tooth, sinusoidal) are provided at various frequencies, (3) a conventional digital-to-analog converter (e.g., Model AD565A, manufactured by Analog Devices, Inc. of Norwood, Mass.) where the voltage output corresponds to a digital input, which can be any arbitrary waveform generated by conventional computer circuits, or (4) any similar voltage supply.

An electro-optic modulator 14 (i.e., Manufacturers No. MZM- 1.5-18-00-03, manufactured by United Technologies Photonics of Bloomfield, Conn.) modulates the optical light generated by the laser 12 onto the electrical signal 24 to be variably delayed so as to produce a variably delayed modulated optical signal output. In its simplest form the electro-optic modulator is an intensity modulator. The modulator 14, however, can be of any format (modulation of the optical frequency, phase, etc.). A controlling electrical source, the wavelength controller 22, e.g., a computer or an electrical circuit capable of producing complex electrical waveforms, may provide a control signal comprised of a ramp signal that results in a ramp of the delay and hence a ramp of the electrical signal phase, which, in turn, results in a frequency shift (serrodyne) of the input electrical signal 24.

The modulated optical signal from the electro-optic modulator 14 propagates along a length of optical fiber 16 (e.g., dispersion compensating fiber, manufactured by Corning, Inc. of Corning, N.Y.) at a velocity dependent on the optical wavelength of the modulated optical signal and the index of refraction of the fiber 16 at that wavelength.

The optical fiber 16 preferably is a highly dispersive fiber (absolute value more than 65 ps/km-nm) in the 1525–1585 nm low-attenuation wavelength window. Utilization of the dispersive optical fiber reduces the overall fiber length and associated overall delay needed to obtain a desired range of relative or differential delay.

The velocity, v, of transmission is computed by the formula $$v(\lambda) = v_0 + v'(\lambda - \lambda_0) \left[ \frac{v''}{2} \right] (\lambda - \lambda_0)^2 + \ldots$$

where $\lambda$ is the wavelength of the laser 12, $v_0$ is the velocity of light in the fiber 16 at the wavelength $\lambda_0$, $v'$ and $v''$ are the first and second derivatives of the velocity with respect to wavelength (at $\lambda_0$), respectively.

The delay of the signal 24, $\tau$, also depends on the laser 12 wavelength, and is given by the formula $$\tau(\lambda) = \frac{L}{v(\lambda)} = \frac{L}{\left[ v_0 + v'(\lambda - \lambda_0) + \frac{v''}{2}(\lambda - \lambda_0)^2 + \ldots \right]}$$

$$= L\left[ D_0 + D'(\lambda - \lambda_0) + \frac{D''}{2}(\lambda - \lambda_0)^2 + \ldots \right]$$

where L is the length of the fiber 16 from the electro-optic modulator 14 to a receiver or photodetector 18. The term D' is referred to as the dispersion in the fiber 16 and is measured in ps/km·nm and D" is the second order dispersion. Since the variation in wavelength $\lambda$ is small, the higher order terms of this equation may be neglected. If the delay when $\lambda_0$ is used is $\tau_0$, then the more important relative or differential delay, $\Delta\tau=\tau-\tau_0$, is given by $\Delta\tau=LD'(\lambda-\lambda_0)$. The $\Delta\tau$ is seen to be proportional to fiber length, L, and therefore the length of the fiber can be chosen to meet a desired range of $\Delta\tau$.

The receiver or photodetector 18 (e.g., Manufacturers Part No. PDC 4310, manufactured by BT&D Technologies of Wilmington, Del.) converts the variably delayed modulated optical signal from optical intensity to an electrical signal output 26. The receiver or photodetector 18 may be an optical intensity sensitive photodetector or an optically coherent photodetection means for converting frequency or phase modulated signals into electrical signals. Further, a receiver 18 may be provided that converts frequency or phase modulated optical carrier signals into intensity modulated optical signal whereupon an optically sensitive photodetector converts the intensity modulated optical signal into an electrical signal.

Figure 2:
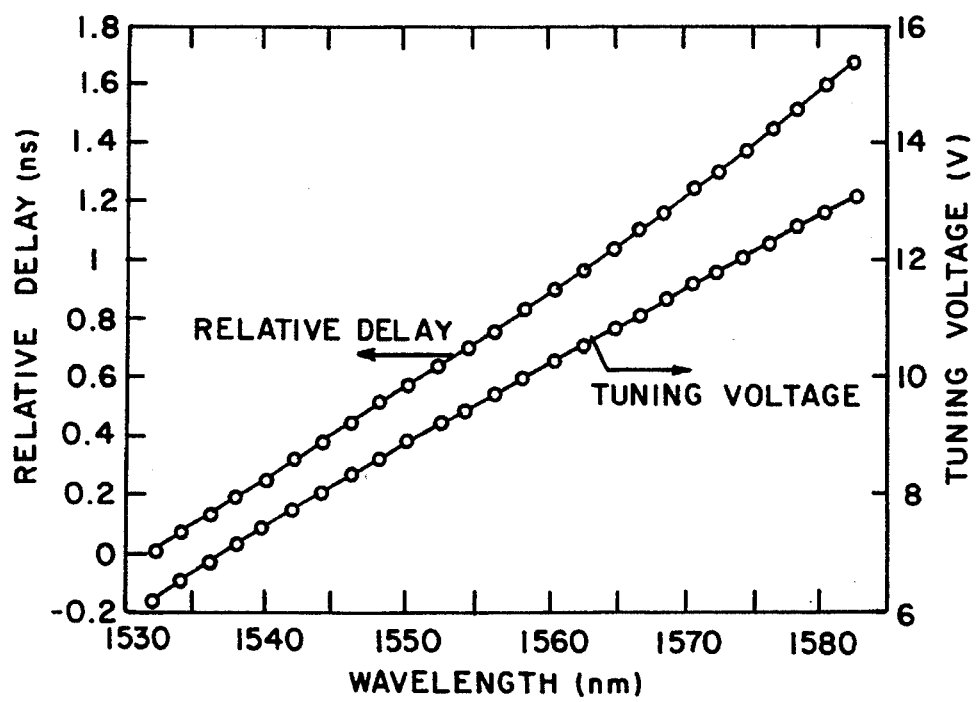
FIG. 2 is a plot of experimental results demonstrating the change in relative delay with a change in wavelength of the σ laser.

Experimental results demonstrating the change in relative delay as the wavelength of the laser is changed and the tuning voltage (limited in this experiment to 13 volts) required to set the wavelength of the σ laser are shown in FIG. 2. The optical fiber utilized in the experiment was a lower dispersion fiber Model SMF-28, manufactured by Corning, Inc. of Corning, N.Y. To the advantage of this technique, there is a near-linear relationship between the relative delay and wavelength and between the tuning voltage and wavelength. Hence, the relative delay is nearly linearly related to the tuning voltage. This fact makes it very easy for the user to select a delay by simply applying the corresponding tuning voltage. Proper selection of the optical fiber, or combination of fibers spliced together, can lead to higher degrees of linearity.

Figure 3:
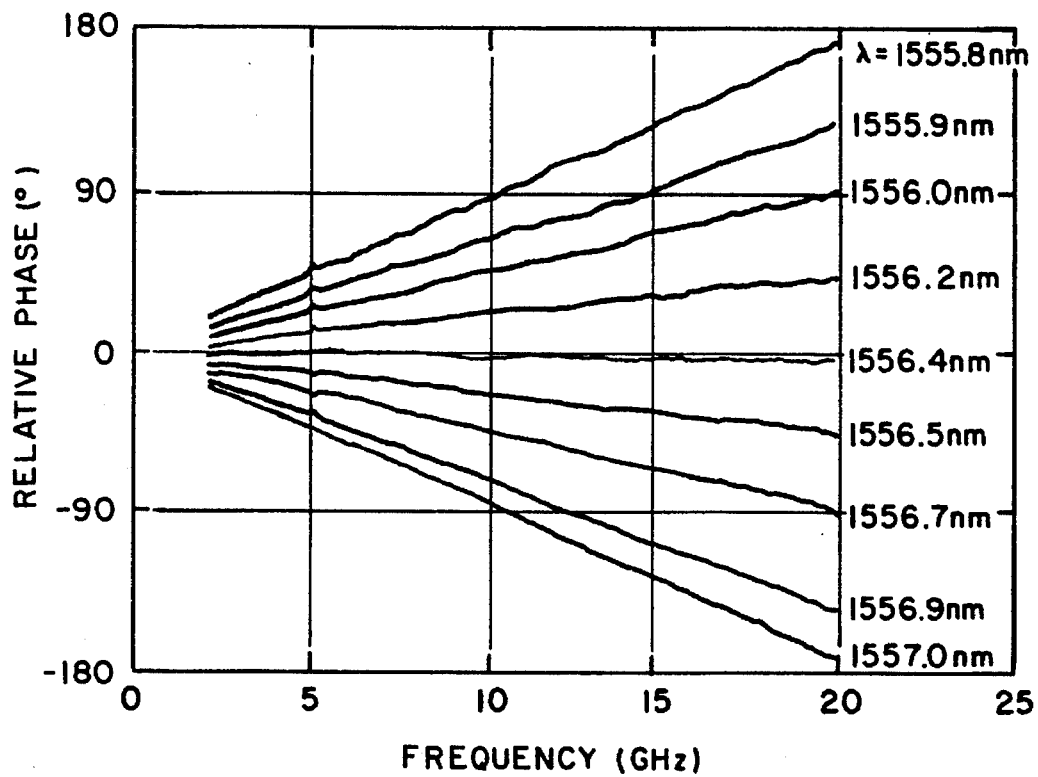
FIG. 3 is a plot of experimental results showing the relative phase measured against frequency for different wavelengths.

A further illustration of the true time delay, the relative phase is measured against frequency for different optical wavelengths in FIG. 3. It is noted that a tuning of 1.2 nm, or 160 mV, yields a full 360° phase shift at 20 GHz.

Figure 4:
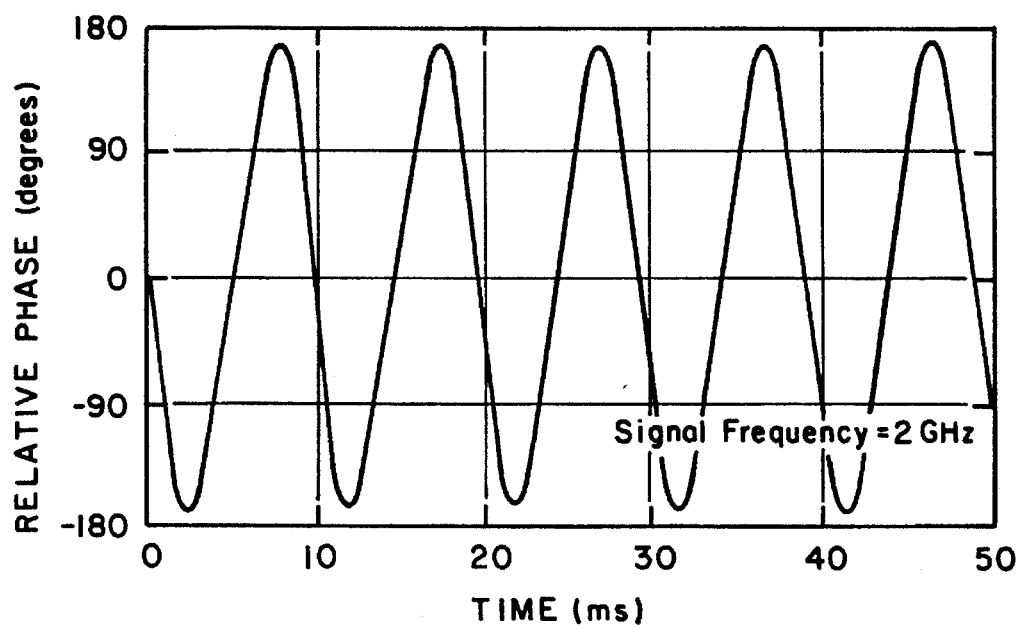
FIG. 4 is a plot of experimental results showing the measurement of time delay (phase shift) as a function of time for 2.6 volt peak-to-peak sinusoidal tuning voltage to the σ laser.

The continuous nature of this invention is shown in FIG. 4. A measurement of the time delay (phase) is shown as a function of time for an input signal frequency of 2 GHz while applying a 2.6 volt peak-to-peak sinusoidal tuning voltage to the σ laser. This plot establishes that the time delay is continuous on the time scales of interest by showing that the measured phase is smooth and does not exhibit jumps. It is important to note that continuous time-delay modulation is required for high fidelity phase or frequency modulation that is free from spurious signals associated with discrete jumps in phase.

Referring to FIG. 3 and FIG. 4, modulation of the laser wavelength provides phase modulation of the input signal. Phase modulation necessarily implies frequency modulation since it is well known in the art that the derivative of the phase with respect to time corresponds to frequency. Therefore this invention can be used for frequency modulation. Furthermore, if the wavelength of the σ-laser 12 is ramped in a sawtooth wave fashion, the resultant saw-toothed modulation in phase corresponds to a constant frequency shift (serrodyne), therefore, the apparatus described in the preferred embodiment could be used to artificially produce frequency shifts.

Figure 5:
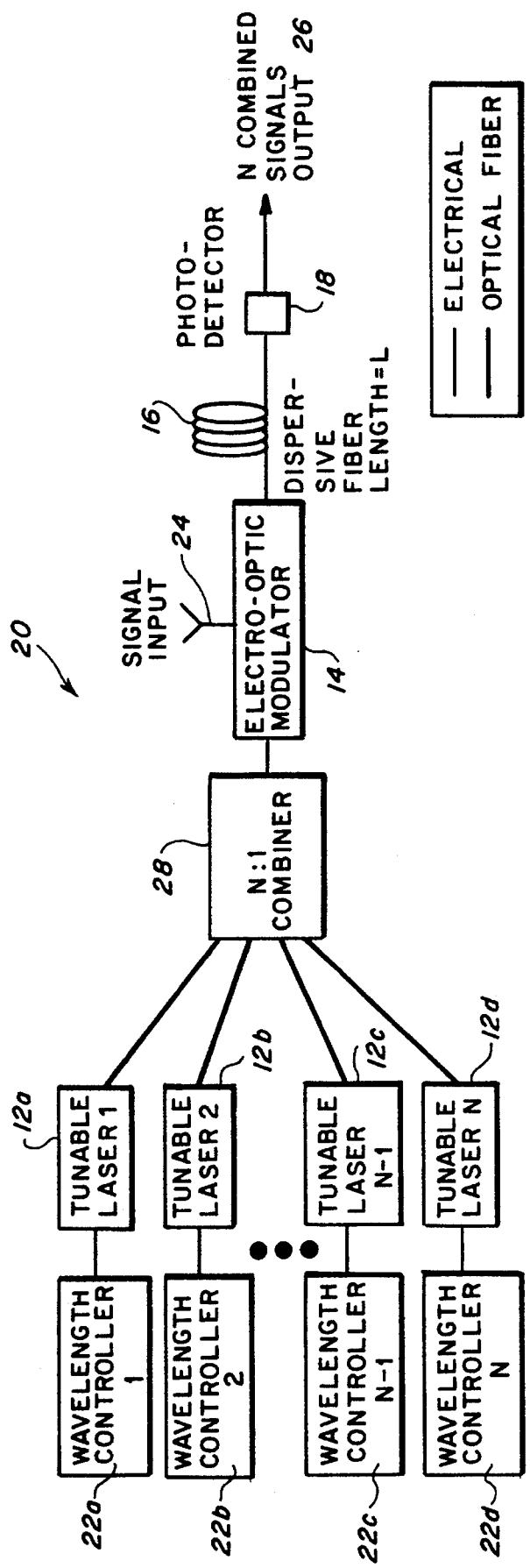
FIG. 5 is a schematic of the fiber optic continuous true time-delay modulator having a plurality of independently tunable optical sources.

Multiple time delay optical signals may be generated by using multiple wavelength lasers or by combining outputs of many lasers to form the optical input to the electro-optic modulator. In a second preferred embodiment, FIG. 5, the laser optical source 22 is a plurality of continuously tunable fiber lasers, 12a, 12b, 12c and 12d with single wavelength outputs. Each laser optical source, 12a, 12b, 12c and 12d, is controlled by a separate wavelength controller, 22a, 22b, 22c and 22d. This embodiment is capable of producing a plurality of optical carriers having narrow spectral width which are combined in a combiner 28 (e.g., Model No, UU-15-17-A-1-D, manufactured by Aster Corp. of Milford, Mass.) that integrates the plurality of optical carriers into a single multiple-wavelength optical carrier which is applied to the electro-optic modulator 14. After the single multiple-wavelength optical carrier is applied to the electro-optic modulator 14, the operation of the device is as previously described in the first preferred embodiment, except that now there is a superposition of electrical output signals, each signal and associated delay corresponds to each of the tunable lasers.

When time-shifted replicas of the input electrical signal are superimposed by the receiver or photodetector 18, then, similar to well-known finite impulse response filters, the net output electrical signal 26 depends on (a) the relative delays and (b) the input signal frequency. Therefore, this time delay circuit is a new wideband implementation of finite impulse response filters with independently controllable delays.

The fiber optic continuous true time-delay modulator has application to a number of signal processing techniques in radar and electronic warfare such as controlling wideband phased arrays or creating phase modulation. Since the preferred embodiments imposes the input electrical signal onto an optical signal and then varies the velocity at which the optical signal travels, it produces a phase shift linearly proportional to input modulation frequency and is free from intermodulation distortion. The fact that the apparatus shown in the preferred embodiment provides for true physical time-delay makes it a wideband technique that produces a frequency dependent phase shift. The time delay is continuously variable, alleviating the problems associated with discrete phase shifters, either microwave or fiber-optic. The extent of the variability of delay is only limited by the fiber length, tunability of the optical source and optical attenuation of the fiber. Variability of delay of over 22 ns has been demonstrated in experiments utilizing the preferred embodiments which improves considerably upon the prior art.

The described apparatus allows the separation of RF/electrical-to-optical conversion and wavelength tunability by imposing the microwave signal on the optical carrier external to the optical source. Many unique advantages are derived, such as, (1) external modulation of the optical source thereby allowing high frequency modulation to 40 GHz and beyond—direct modulation of laser diodes, as shown in the prior art, appears to have limited the bandwidth to <18 GHz; (2) widely tunable lasers (lasers that cannot be modulated) may be utilized as sources of external modulation, in the prior art it has been difficult to achieve wide tunability and wide bandwidth operation in a single diode laser (cleaved-coupled-cavity, $C^3$ laser); (3) several different optical sources (e.g., lasers) can be combined and modulated simultaneously in the external modulator, thereby resulting in several corresponding signals having a corresponding delay, whereas in the prior art, although several diode lasers could be modulated by the same signal, it was extremely difficult to synchronize a large number of signals; and (4) continuously tunable laser sources may be used with external modulation, where in the prior art diode lasers exhibit mode hops—$C^3$ lasers can only emit in thirteen different discrete wavelength modes thereby limiting the prior art to thirteen discrete delays. Also, tunable optical filters in the prior art have wide (>1 nm) filter bandwidths thereby resulting in uncertainty of wavelength and other signal degradations.

Several drawbacks of the prior art are overcome with this invention. Firstly, when utilized, the cleaved-coupled-cavity ($C^3$) laser only emits light at discrete wavelengths and so offers only discrete time delays. Secondly, it is very difficult to fabricate and operate laser diodes that exhibit wide tunability and high-frequency capability, simultaneously; namely, the RF/electrical signal can unintentionally alter the laser's wavelength. Thirdly, similarly it is very difficult to fabricate and operate a wideband superluminescent source (with 3 dB spectral linewidth of 20 nm) that simultaneously can be directly modulated to high frequencies (greater than 1 GHz). Fourthly, filtering a wideband superluminescent source reduces the optical power (proportional to the percentage of filtering) and cannot achieve wide tunability (>50 nm) and narrow selectivity (<0.2 nm), simultaneously. Wide tunability is required to maximize the time delay effect and narrow selectivity is needed to reduce dispersing of the signal in time, which leads to time-delay jitter and inaccuracies, noise, and loss of signal. Compared to the prior art, the techniques described herein reverses the roles of the optical source and modulator. This invention utilizes a laser that (a) inherently exhibits a narrow spectral linewidth (<0.08 nm), (b) is easily widely tunable (~50 nm), and (c) is not modulated directly with the RF/electrical signal. The laser is combined with an external modulator that (a) imposes an RF/electrical signal on the tunable optical signal and (b) can be specifically designed for each application, in particular for high-speed operation (currently modulators exhibit 3 dB bandwidth at >50 GHz).

Since this apparatus is implemented using fiber optics, it is inherently compact providing both a weight and volume reduction over currently utilized time-delay methods. Another advantage of this apparatus is that the time-delay, (phase shift) is controlled by means of a low (0–10 Volt) power signal which tunes the wavelength of the source. This minimizes the interface requirements and limits the rate of phase shift only by the rate at which the source can be tuned. With minor modifications, the apparatus described in the preferred embodiment can be easily added to existing optical processing systems.

What is claimed is:

1. A fiber optic continuous true time-delay modulator for producing a continuously variable propagation delay in an electrical circuit comprising:

means for producing an optical carrier signal of a predetermined optical wavelength;

means for producing a first electrical signal;

means for modulating said optical carrier signal with said first electrical signal to produce a modulated optical signal;

means for controlling the wavelength of the optical carrier signal thereby setting and varying the propagation delay of the first electrical signal;

means for propagating the modulated optical signal at a velocity dependent on the optical wavelength of the modulated optical signal; and means for converting the modulated optical signal into a second electrical signal.

2. A fiber-optic true time-delay modulator for producing a continuously variable propagation delay in an optical circuit comprising:

a laser optical source with wavelength controllable elements producing an optical carrier with a spectral linewidth of less than 0.08 nm;

means for controlling the wavelength controllable elements of the laser optical source;

means for receiving and modulating the optical carrier with a first electrical signal that is to be variably delayed thereby producing a modulated optical signal output;

an optical fiber exhibiting wavelength dependent optical velocity to propagate and delay said modulated optical signal and thereby produce a variable delayed modulated optical signal; and means for receiving and converting said variably delayed modulated optical signal into a second electrical signal.

3. A fiber optic continuous true time-delay modulator, as in claim 2, wherein said optical fiber is a dispersive optical fiber.

4. A fiber optic continuous true time-delay modulator, as in claim 2, wherein said receiving means is an optical intensity sensitive photodetector for converting the variably delayed modulated optical signal to a second electrical signal.

5. A fiber optic continuous true time-delay modulator, as in claim 2 wherein said receiving means is an optically coherent photodetection means for converting frequency modulated signals to a second electrical signal.

6. A fiber optic continuous true time-delay modulator, as in claim 2 wherein said receiving means is an optically coherent photodetection means for converting a phase modulated optical signal into a second electrical signal.

7. A fiber optic continuous true time-delay modulator, as in claim 2, wherein said receiver means is further comprised of a means for converting a frequency modulated optical carrier signal into an intensity modulated optical signal and an optically sensitive photodetector to convert the intensity modulated optical signal into a second electrical signal.

8. A fiber optic continuous true time-delay modulator, as in claim 2, wherein said receiver means further comprises a means to convert a phase modulated optical carrier signal into an intensity modulated optical carrier signal and an optically sensitive photodetector for converting the intensity modulated optical signal to a second electrical signal.

9. A fiber optic continuous true time-delay modulator, as in claim 2, wherein the laser optical source is a continuously-tunable laser.

10. A fiber optic continuous true time-delay modulator, as in claim 9, wherein the tunable laser is a sigma ($\sigma$) laser.

11. A fiber optic continuous true time-delay modulator, as in claim 9, wherein the tunable laser is a semiconductor laser.

12. A fiber optic continuous true time-delay modulator, in claim 2, wherein the laser optical carrier source is a multiple-wavelength laser producing a plurality of optical carriers providing a plurality of time-shifted replicas of the input signal.

13. A fiber optic continuous true time-delay modulator, as in claim 12, wherein the multiple-wavelength laser source is a plurality of single-wavelength laser optical carrier sources having narrow spectral width.

14. A fiber optic continuous true time-delay modulator, as in claim 13, further comprising a means for combining the plurality of optical carriers having a narrow spectral width into a single multiple-wavelength optical carrier.

15. A fiber optic continuous true time-delay modulator, as in claim 13, wherein the single-wavelength laser optical carrier sources are independently tunable.

16. A fiber optic continuously true time-delay modulator, as in claim 2, wherein said modulator means is an optical intensity modulator.

17. A fiber optic continuous true time-delay modulator, as in claim 2, wherein said modulator means is a optical frequency modulator.

18. A fiber optic continuous true time-delay modulator, as in claim 2, wherein said modulator means is an optical phase modulator.

19. A fiber optic continuously true time-delay modulator, as in claim 2, wherein said means for controlling the wavelength controllable elements is an electrical controller with a constant voltage power supply.

20. A fiber optic continuous true time-delay modulator, as in claim 19, wherein the electrical controller is an electrical signal generator.

21. A fiber optic continuous true time-delay modulator, as in claim 19, wherein the electrical controller is a digital-to-analog converter.

22. A fiber optic continuous true time-delay modulator, as in claim 19, wherein the electrical controller produces a frequency shift in the first electrical signal by utilizing a ramp signal.

23. A fiber optic continuous true time-delay modulator, as in claim 19, wherein the electrical controller is an electrical circuit for producing complex electrical waveforms.

* * * * *